United States Patent [19]

Laarmann

[11] Patent Number: 5,088,909
[45] Date of Patent: Feb. 18, 1992

[54] APPARATUS FOR EXTRUDING A MARBLEIZED SYNTHETIC-RESIN STRAND

[75] Inventor: Willi Laarmann, Essen, Fed. Rep. of Germany

[73] Assignee: W. Dollken & Co. GmbH, Essen, Fed. Rep. of Germany

[21] Appl. No.: 657,731

[22] Filed: Feb. 19, 1991

[30] Foreign Application Priority Data

Mar. 7, 1990 [DE] Fed. Rep. of Germany ........ 4007234

[51] Int. Cl.$^5$ .................................................. B29C 47/12
[52] U.S. Cl. ................................ 425/131.1; 264/75; 264/245; 264/349; 425/206; 425/381; 425/462
[58] Field of Search ................... 264/75, 245, 349; 425/131.1, 132, 133.1, 206-208, 462, 381, 465, 209, 466, 382.3

[56] References Cited

U.S. PATENT DOCUMENTS

| | | | |
|---|---|---|---|
| 2,632,204 | 3/1953 | Murray | 264/75 |
| 3,531,828 | 10/1970 | Nauta | 425/131.1 |
| 3,664,789 | 5/1972 | Gibney | 425/381 |
| 3,778,207 | 12/1973 | Luraschi | 425/462 |
| 3,914,362 | 10/1975 | Randall | 264/75 |
| 4,185,951 | 1/1980 | Webermeier et al. | 425/462 |
| 4,834,639 | 5/1989 | Eschbach et al. | |
| 4,921,414 | 5/1990 | Schliehe et al. | 425/206 |

FOREIGN PATENT DOCUMENTS

| | | |
|---|---|---|
| 2117045 | 10/1972 | Fed. Rep. of Germany ... 425/131.1 |
| 3538116 | 6/1988 | Fed. Rep. of Germany . |
| 3717967 | 3/1989 | Fed. Rep. of Germany . |

*Primary Examiner*—Jeffery Thurlow
*Attorney, Agent, or Firm*—Herbert Dubno; Andrew Wilford

[57] ABSTRACT

A marbleized thermplastic-resin strand is made from a matrix resin and an inlay resin in an apparatus having a die forming a passage extending along an axis and havng an upstream inlet end and a downstream outlet end and an extruder for injecting the matrix resin in hot liquefied condition into the passage at the upstream end thereof such that the resin emerges from the downstrea end. An inlay nozzle opens into the passage between its ends and extends through the die along a nozzle axis not parallel to the passage axis. The inlay resin is fed in hot liquefied condition through the nozzle into the passage such that the inlay resin mixes with the matrix resin. The inlay nozzle is rotated substantially continuously about its nozzle axis so long as the extruder is operating. Thus the patterning of the inlay resin in the matrix resin is a function of the rotation speed of the inlay nozzle.

5 Claims, 3 Drawing Sheets

APPARATUS FOR EXTRUDING A MARBLEIZED SYNTHETIC-RESIN STRAND

FIELD OF THE INVENTION

The present invention relates to the extrusion of a marbleized or veined synthetic-resin strand. More particularly this invention concerns a method of and apparatus for making such a thermoplastic resin workpiece.

BACKGROUND OF THE INVENTION

It is standard in the production of trim or edge strips used in the manufacture of furniture to use a veined or marbleized synthetic-resin strand that is formed of two different resins that contrast somewhat and that are not completely mixed so that the resultant product has a surface on which the two resins are distinct. Such a resin workpiece can pass for a naturally occurring material but is of course much cheaper and also normally more durable than the material it is replacing.

A typical machine for making such a marbleized strand is seen in German patent 3,538,116 filed 26 Oct. 1985 and assigned to Rehau AG & Co. Here an extruder forces the hot liquefied matrix resin through an appropriately shaped die and the inlay resin is introduced into the extruder passage at the downstream end of the extruder worm. To mix the matrix and inlay resins the extruder worm is provided with radially projecting paddles or vanes. Thus the extent of veining or marbleizing is determined mainly by how fast the extruder worm is rotating. When it turns rapidly the veining is fine and when it turns slowly the veining is coarse.

It is also known from U.S. Pat. No. 4,834,639 to introduce the inlay or pattern resin into the worm so that it can exit therefrom into the matrix resin from holes in the worm. Once again the rotation rate of the worm determines the extent of mixing, although of course some minor effect on patterning can be achieved by varying the pressure with which the inlay resin is injected. The main disadvantage of such an arrangement is that the rotation rate of the worm also affects various other parameters such as the temperature of the matrix resin and the speed with which the matrix resin is moved. Thus when worm speed is adjusted to change the patterning, other unwanted effects are obtained.

The system of U.S. Pat. No. 4,921,414 of W. Schliehe et al has a nozzle which projects radially into the axial flow of matrix resin in the nozzle or die passage immediately downstream of the worm. The inlay resin is injected via this nozzle into the matrix-resin strand from a plurality of holes on the inlay nozzle that are directed to open downstream into the matrix-resin flow. Downstream of the inlay nozzle is a plate formed with a multiplicity of apertures that break up the combined inlay/matrix flow. Thus in this arrangement the only way to change the patterning of the inlay resin is to change the inlay nozzle and/or the aperture plate.

OBJECTS OF THE INVENTION

It is therefore an object of the present invention to provide an improved system for making a marbleized synthetic-resin strand.

Another object is the provision of such an improved system for making a marbleized synthetic-resin strand which overcomes the above-given disadvantages, that is which allows the patterning of the inlay resin to be controlled easily, even during a production run without stopping the extruder of the matrix resin.

A further object is an improved method of operating an extruder assembly to produce a marbleized or veined thermoplastic-resin strand.

SUMMARY OF THE INVENTION

A marbleized thermoplastic-resin strand is made from a matrix resin and an inlay resin in an apparatus having a die forming a passage extending along an axis and having an upstream inlet end and a downstream outlet end and an extruder for injecting the matrix resin in hot liquefied condition into the passage at the upstream end thereof such that the resin emerges from the downstream end. An inlay nozzle opens into the passage between its ends and extends through the die along a nozzle axis not parallel to the passage axis. The inlay resin is fed in hot liquefied condition through the nozzle into the passage such that the inlay resin mixes with the matrix resin. In accordance with the invention the inlay nozzle is rotated substantially continuously about its nozzle axis so long as the extruder is operating. Thus the patterning of the inlay resin in the matrix resin is a function of the rotation speed of the inlay nozzle.

With this system, therefore, the patterning of the inlay resin is almost solely a function of how fast its nozzle rotates. When it rotates rapidly, the mixing will be extensive for a very fine patterning, and vice versa when it is rotated slowly. The critical worm-rotation speed need not be changed just to affect the patterning.

According to features of this invention the extruder includes an extruder housing connected to the die, a worm rotatable in the housing generally about the passage axis, and a drive independent of the nozzle drive for rotating the worm about the passage axis. As mentioned above, the rotation rates of the nozzle and worm are independent of each other. Furthermore the nozzle has a shaft journaled in the die and extending along the nozzle axis and an inner end carried on the shaft, formed with an outlet opening, and projecting into the passage. The inner end can be formed with a plurality of such outlet openings.

In accordance with the invention the nozzle axis can be radial and perpendicular to the passage axis. It can also extend at an acute angle to the passage axis. The inner end can be offset from the center of the passage. In fact means can be provided for moving the inner nozzle end radially of the passage axis to further vary the patterning effect.

The method of this invention therefore comprises the critical step of rotating the inlay nozzle substantially continuously about its nozzle axis so that the patterning of the inlay resin in the matrix resin is a function of the rotation speed of the inlay nozzle. Also important to the method is the fact that the rotation rate of the worm be unrelated to the rotation rate of the nozzle. The nozzle rotation rate is changed to alter the patterning effect of the inlay resin without changing the rotation rate of the worm.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
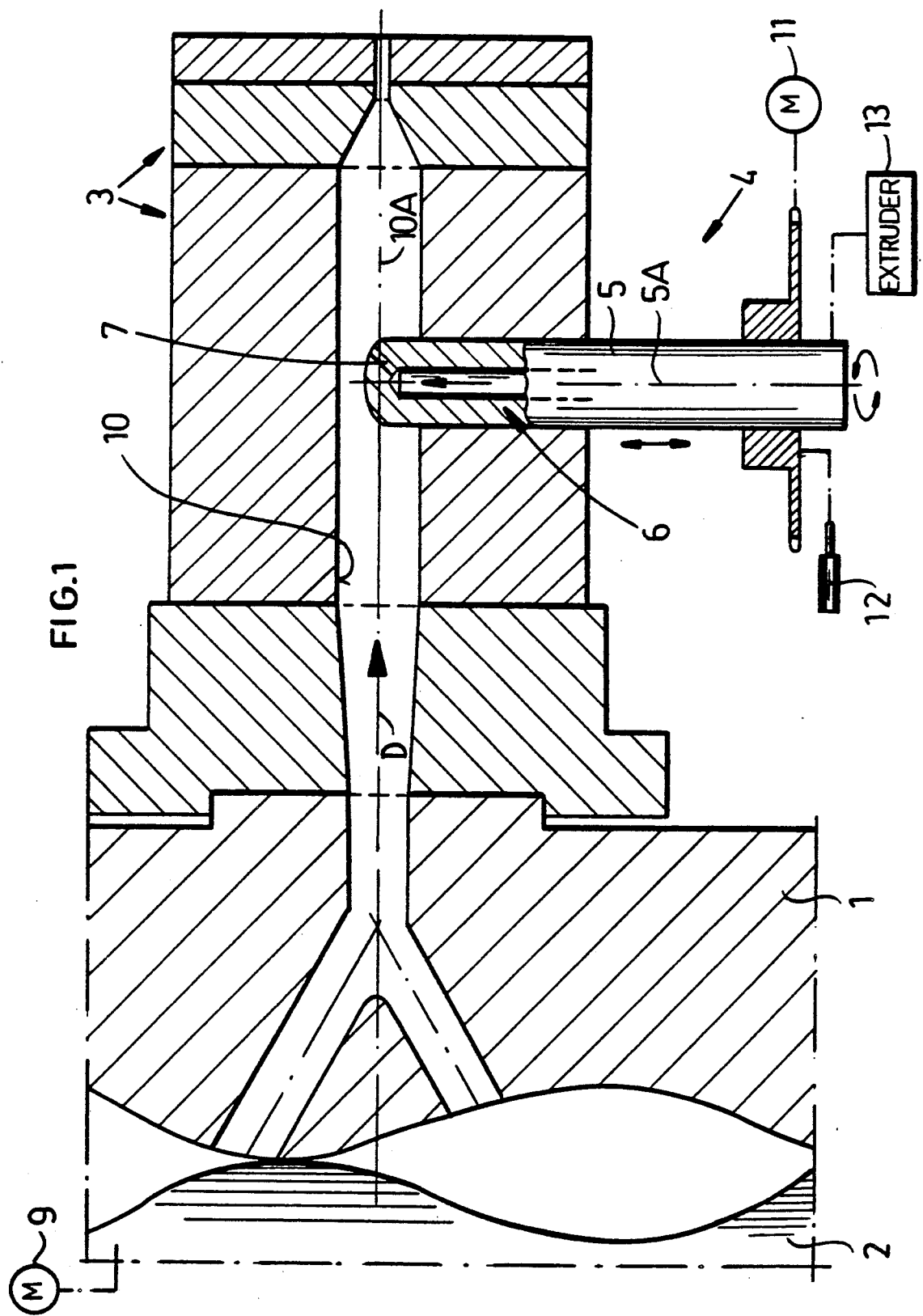
FIG. 1 is a partly diagrammatic axial section through an extruder assembly according to this invention.

As seen in FIG. 1 an extruder has a housing 1 in which a worm 2 is rotated by a schematically illustrated drive 9 to deliver a plastified matrix resin to the upstream end of a passage 10 formed in an extrusion die 3 so as to emerge from a downstream end thereof, the flow direction being indicated by an arrow D. According to this invention an inlay-resin injector 4 receiving a plastified inlay resin from an extruder 13 has a shaft 5 extending along an axis 5A and projecting at an inner end into the passage 10. The shaft 5 is formed with an axial passage 6 for the inlay resin and is formed at its inner end with an angled outlet opening 7 so that the resin fed under pressure to the passage 6 exits from the opening 7 into the mass flowing along the passage 10.

According to the invention the axis 5A is radial to a center axis 10A of the passage 10 and the shaft 5 is journaled in the die 3 so that it can be rotated about this axis 5A by a drive illustrated schematically at 11. Such rotation of the nozzle assembly 4 causes the offcenter opening 7 to eject its inlay resin into the matrix-resin mass in the passage 10 at a location that moves within this matrix-resin mass. An actuator 12 can even be provided to move the nozzle 4 along its axis 5A, that is radially of the die axis 10A, to further vary the patterning effect.

Figure 2:
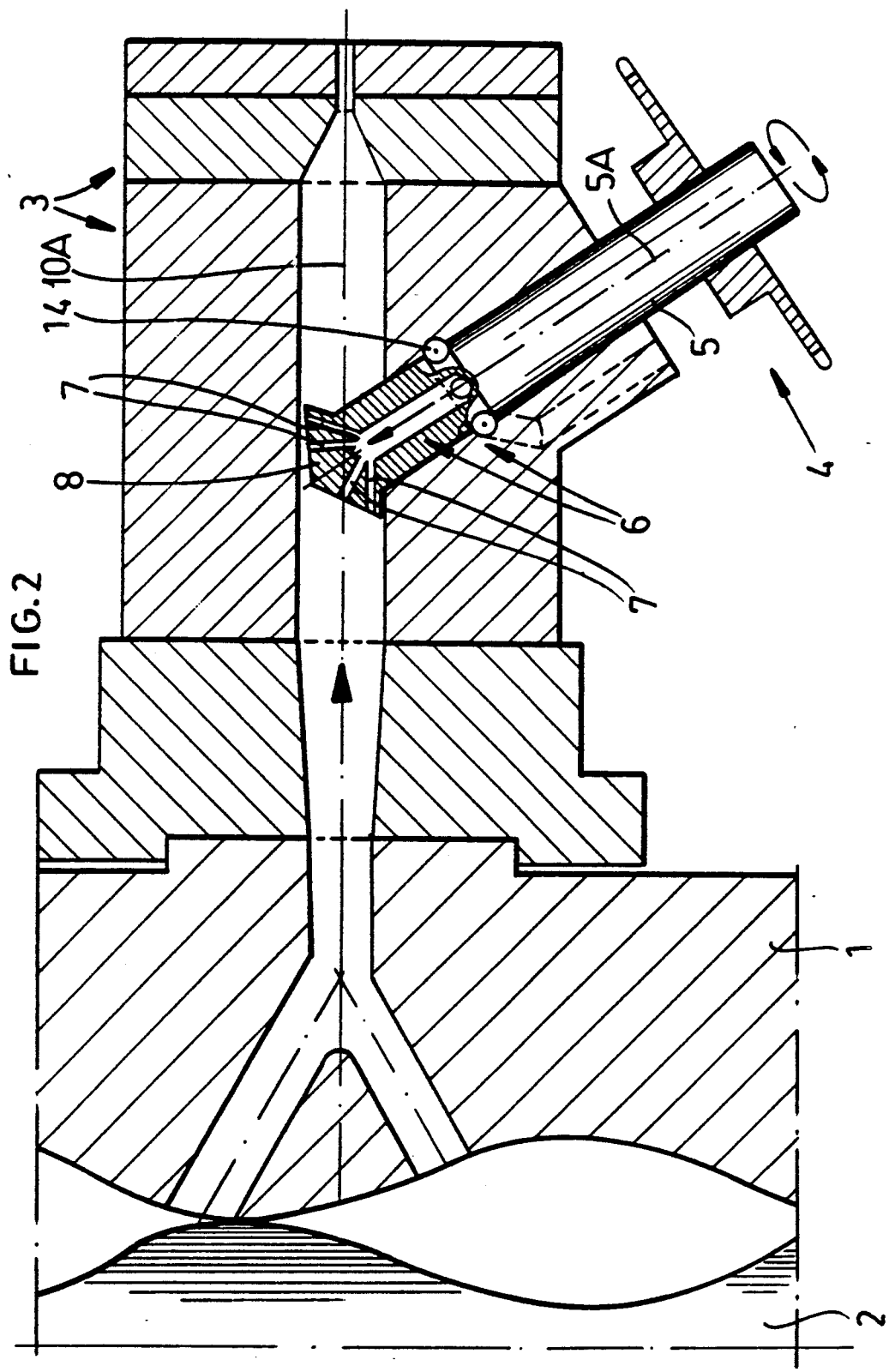
FIGS. 2 and 3 are views like FIG. 1 of alternative arrangements according to the invention.

FIG. 2 shows a similar arrangement, but here the shaft 5 has an enlarged frustoconical head 8 formed with a plurality of such openings 7. A bearing 14 is provided to support the shaft 5 in the die 3, and here the axis 5A runs at an acute angle of about 55° to the axis 10A which it intersects. Otherwise this embodiment is identical to that of FIG. 1.

Figure 3:
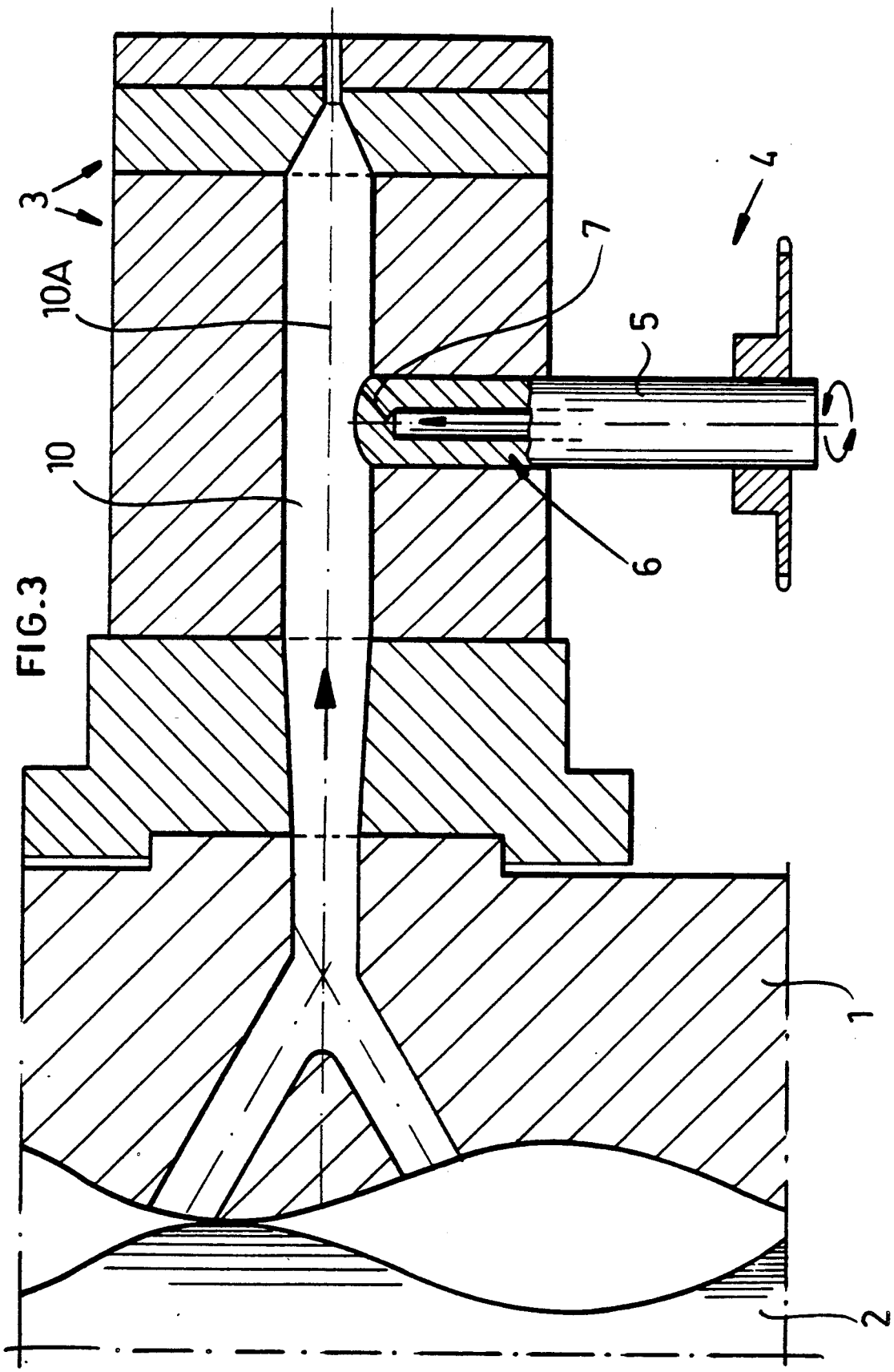

In FIG. 3 the system is identical to that of FIG. 1 but the inner end of the shaft 5 is pulled back from the axis 10A to be offcenter therein. This system is useful where the matrix-resin mass in the circular-section passage 10 is twisting about the axis 10A due to the effect of the worm 2 as it produces a marked surface patterning.

I claim:

1. An apparatus for making a marbleized thermoplastic-resin strand from a matrix resin and an inlay resin, the apparatus comprising:

a die forming a passage extending along an axis and having an upstream inlet end and a downstream outlet end;

means including an extruder for injecting the matrix resin in hot liquefied condition into the passage at the upstream end thereof such that the resin emerges from the downstream end;

an inlay nozzle opening into the passage between its ends and extending through the die along a nozzle axis forming an acute angle with the passage axis, the nozzle having
      a shaft journaled in the die and extending along the nozzle axis, and
      an inner end carried on the shaft, formed with an outlet opening, and projecting into the passage;

means for feeding the inlay resin in hot liquefied condition through the nozzle into the passage such that the inlay resin mixes with the matrix resin; and drive means for rotating the inlay nozzle substantially continuously about its nozzle axis, whereby the patterning of the inlay resin in the matrix resin is a function of the rotation speed of the inlay nozzle.

2. The apparatus defined in claim 1 wherein the extruder includes
   an extruder housing connected to the die upstream of the inlay nozzle,
   a worm rotatable in the housing generally about the passage axis, and
   drive means independent of the nozzle drive means for rotating the worm about the passage axis, the rotation rates of the nozzle and worm being independent of each other.

3. The apparatus defined in claim 1 wherein the inner end is formed with a plurality of such outlet openings.

4. The apparatus defined in claim 1 wherein the inner end is offset from the center of the passage.

5. The apparatus defined in claim 1 wherein the nozzle opening opens offset from the nozzle axis.

* * * * *